(12) United States Patent
Tochihara et al.

(10) Patent No.: US 9,359,477 B2
(45) Date of Patent: Jun. 7, 2016

(54) PRODUCTION METHOD FOR POLYAMIDE (71) Applicant: Mitsubishi Gas Chemical Company, Inc., Tokyo (JP)

(72) Inventors: Tatsuya Tochihara, Niigata (JP); Katsumi Shinohara, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 14/381,182

(22) PCT Filed: Feb. 25, 2013

(86) PCT No.: PCT/JP2013/054828
§ 371 (c)(1),
(2) Date: Aug. 26, 2014

(87) PCT Pub. No.: WO2013/129341
PCT Pub. Date: Sep. 6, 2013

(65) Prior Publication Data
US 2015/0073120 A1    Mar. 12, 2015

(30) Foreign Application Priority Data
Feb. 28, 2012   (JP) ................................. 2012-041523

(51) Int. Cl.
| C08G 69/28 | (2006.01) |
|---|---|
| C08L 77/10 | (2006.01) |
| C08G 69/26 | (2006.01) |
| B01J 19/00 | (2006.01) |
| B01J 19/18 | (2006.01) |
| B01F 7/00 | (2006.01) |
| C08L 77/06 | (2006.01) |
| B01F 7/16 | (2006.01) |

(52) U.S. Cl.
CPC ............ *C08G 69/28* (2013.01); *B01F 7/00266* (2013.01); *B01F 7/00291* (2013.01); *B01F 7/00441* (2013.01); *B01F 7/00641* (2013.01); *B01F 7/16* (2013.01); *B01J 19/0066* (2013.01); *B01J 19/18* (2013.01); *C08G 69/26* (2013.01); *C08G 69/265* (2013.01); *C08L 77/06* (2013.01); *C08L 77/10* (2013.01)

(58) Field of Classification Search
CPC ......... C08L 77/06; C08L 77/10; C08G 69/26; C08G 69/265; B01F 7/16
See application file for complete search history.

(56) References Cited

U.S. PATENT DOCUMENTS

2009/0299027 A1*  12/2009  Kurose et al. ................. 528/340
2012/0177937 A1*   7/2012  Ogawa et al. ................. 428/458

FOREIGN PATENT DOCUMENTS

| EP | 2 130 853 A2 | 12/2009 |
|---|---|---|
| JP | 1982-200420 | 8/1982 |
| JP | 04-102631 U | 9/1992 |
| JP | 2002-348304 A | 12/2002 |
| JP | 2010-007055 A | 1/2010 |
| JP | 2010-007056 A | 1/2010 |
| WO | 2011/030910 A1 | 3/2011 |
| WO | 2011/065347 A1 | 6/2011 |

OTHER PUBLICATIONS

International Search Report from the International Bureau of WIPO for International Application No. PCT/JP2013/054828 dated May 14, 2013, and English translation of the same (4 pages).
European Search Report dated Sep. 2, 2015, for EP 13754725.3. (8 pages).

* cited by examiner

*Primary Examiner* — Gregory Listvoyb
(74) *Attorney, Agent, or Firm* — Fitch Even Tabin & Flannery LLP (57) ABSTRACT

The present invention is directed to a process for producing a polyamide, which process includes directly melt-polymerizing a diamine component including 70 mol % or more of p-xylylenediamine and a dicarboxylic acid component including 70 mol % or more of a C6 to C18 aliphatic dicarboxylic acid, in the absence of solvent in a batch-type reactor equipped with a stirring blade, the process including: (1) reacting the diamine component with the dicarboxylic acid component under a pressure condition of 0.2 to 0.5 MPa (Abs); (2) maintaining a vapor phase section of a reaction tank of the reactor at 200° C. or higher during reaction; (3) stirring the contents of the reaction tank, from the start of adding the diamine component until after completion of the addition and before the start of pressure falling, such that the stirring-related Froude number represented by a specific formula is adjusted to 0.0002 to 0.15; and (4) employing a stirring blade having no structural body in the horizontal direction or having a structural body in the horizontal direction, which body does not come into contact with the interface between the reaction mixture and the vapor phase section during stirring. In the polyamide production process, deposition of solid matter in the reaction tank vapor section and in a vapor pipe is suppressed, and incorporation into the product of unmelted solid matter originating from the deposits is reduced.

12 Claims, 1 Drawing Sheet

PRODUCTION METHOD FOR POLYAMIDE

CROSS-REFERENCE TO RELATED APPLICATIONS

This application is a U.S. national phase application filed under 35 U.S.C. §371 of International Application PCT/JP2013/054828, filed on Feb. 25, 2013, designating the United States, which claims priority from Japanese Application Number 2012-041523, filed Feb. 28, 2012, which are hereby incorporated herein by reference in their entirety.

TECHNICAL FIELD

The present invention relates to a process for producing a polyamide advantageously utilized for applications such as molding materials, bottles, sheets, films, and fibers. More particularly, the present invention relates to a batch process for producing a polyamide, which process comprises directly melt-polymerizing, in the absence of solvent, a diamine component including 70 mol % or more of p-xylylenediamine and a dicarboxylic acid component including 70 mol % or more of a C6 to C18 aliphatic dicarboxylic acid.

BACKGROUND ART

One generally and widely known example of the process for producing a polyamide through polycondensation of a dicarboxylic acid component and a diamine component includes producing an aqueous solution of a nylon salt from a dicarboxylic acid component and a diamine component and subsequently melt-polymerizing the nylon salt under pressurized conditions.

Another disclosed example of the process includes directly melt-polymerizing a dicarboxylic acid component and a diamine component in the absence of solvent without preparing an aqueous solution of a nylon salt (see Patent Document 1). In this process, the diamine component is added while the temperature of the formed polymer is elevated at the melting point of the polymer or higher. Thus, the process is economically advantageous, since there is no need for removal of water (water of aqueous solution of a nylon salt) or solvent through distillation.

In this production process, it is advantageous from the standpoint of production that the boiling point of the diamine component be equal to or higher than that the melting point of the formed polyamide. When the boiling point of the diamine component is lower than the melting point of the polyamide, polycondensation does not efficiently proceed, due to vaporization of the added diamine. The boiling point of xylylenediamine is about 274° C., which is relatively higher than boiling points of other diamines conventionally used for production of polyamides. For example, hexamethylenediamine has a boiling point of 199 to 205° C. Therefore, the production process including directly melt-polymerizing a dicarboxylic acid component and a diamine component in the absence of solvent is advantageous when xylylenediamine is used.

On the other hand, in the production process including directly melt-polymerizing a dicarboxylic acid component and a diamine component in the absence of solvent, the dicarboxylic acid component and the diamine component readily scatter as monomer components in the vapor phase, resulting in formation of a nylon salt and oligomers in the vapor phase section and other sections of the reactor. The thus-formed nylon salt and oligomers are generally dissolved in water which is generated through polycondensation between the dicarboxylic acid component and the diamine component, whereby the salt and oligomers return to the reaction mixture. Thus, no serious problem occurs in terms of product quality and the production process.

However, when the p-xylylenediamine content of the diamine component is 50 mol % or more, deposits are gradually observed in a pipe that connects a reaction tank with a partial condenser and in the vapor phase section of a reaction pot. As the p-xylylenediamine content increases, the water solubility of the salt formed from the diamine component and the dicarboxylic acid component decreases. This phenomenon is more significant when the p-xylylenediamine content of the diamine component is 70 mol % or more. Since the salt formed from the diamine monomer and the dicarboxylic acid monomer has poor solubility in water formed through polycondensation, the salt cannot be washed out but is deposited in the vapor section of a reaction tank and in a vapor pipe.

Such deposition tends to occur particularly in the vapor phase section of the reaction tank, which hereinafter may be referred to as "the reaction tank vapor phase section," and in a pipe that connects a reaction tank with a partial condenser, for the following reasons. That is, these members are lower in temperature than other members, and the deposited matter has poor solubility in water at high temperature, resulting in further deposition on the deposits, to thereby form considerable mass of deposits. In addition, when the deposits are heated, the degree of polymerization may increase, or gelation may occur.

When assuming a block form, the deposits may be peeled off from the aforementioned members during production of polyamide and incorporated into the product as solid matter, to thereby deteriorate the quality of the product. Such solid matter causes problems such as clogging of die holes during discharge of the polyamide from the reaction apparatus and interruption of strand formation, whereby stable pelletizing operation is disturbed. Therefore, the reaction apparatus must be periodically opened, and the solid matter must be manually removed or washed off with solvent or the like.

Meanwhile, there is disclosed a method for synthesizing polyamide, which method attains an enhanced productivity by suppressing formation of block-form deposits (see Patent Document 2). In the disclosed method, deposition of solid matter in a stirring apparatus is suppressed by a characteristic design of stirring blades. However, this patent document does not disclose the effects of suppressing deposition of a nylon salt and oligomers in the reaction tank vapor phase section and in a pipe that connects a reaction tank with a partial condenser.

Another document discloses that, in a method for producing a polyamide including a diamine component having a xylylenediamine content of 70 mol % or more, the xylylenediamine containing 20 mol % or more p-xylylenediamine, and 70 mol % or more of adipic acid, deposition of polymer in the reaction tank is suppressed through direct dropwise addition of the diamine component to the dicarboxylic acid component at an elevated pressure range of 0.1 to 0.4 MPaG (see Patent Document 3). Patent Document 3 discloses the effect of suppressing deposition when the polyamide has the aforementioned composition under the above pressure conditions. However, a polyamide resin which may form a salt having poor water solubility; e.g., a polyamide resin including a diamine component having a p-xylylenediamine content of 70 mol % or more, and a dicarboxylic acid component, readily provide deposits. In this case, a satisfactory effect of suppressing deposition cannot be attained even when the polyamide is synthesized under pressurized conditions.

Under the aforementioned circumstances, when a polyamide is produced by directly melt-polymerizing a dicarboxylic acid component and a diamine component in the absence of solvent by using a diamine component having a p-xylylenediamine content of 70 mol % or more, there is demand for a process that can enhance productivity by suppressing deposition of solid matter in the reaction tank vapor section and in a vapor pipe and which can suppress deposition of solid matter in the reaction tank vapor phase section and in a pipe that connects the reaction tank with a partial condenser, in order to reduce incorporation, into the product, of unmelted solid matter originating from the deposits.

PRIOR ART DOCUMENTS

Patent Documents

Patent Document 1: Japanese Patent Application Laid-Open (kokai) No. 1982-200420
Patent Document 2: Japanese Patent Application Laid-Open (kokai) No. 2010-7056
Patent Document 3: Japanese Patent Application Laid-Open (kokai) No. 2010-7055

SUMMARY OF THE INVENTION

Problems to be Solved by the Invention

An object of the present invention is to provide a batch-manner process for producing polyamide including direct melt polymerization of a diamine component having a p-xylylenediamine content of 70 mol % or more, and a dicarboxylic acid content, in the absence of solvent, in which process deposition of solid matter in the reaction tank vapor section and in a vapor pipe is suppressed, and incorporation into the product of unmelted solid matter originating from the deposits is reduced.

Means for Solving the Problems

The present inventors have conducted extensive studies in order to attain the aforementioned object, and have found that, when a polyamide is synthesized by means of stirring blades having a specific shape under specific conditions, there can be reduced deposition of solid matter in the reaction tank vapor phase section, in a pipe that connects a reaction tank with a partial condenser, and in other members, as well as incorporation of unmelted matter into the product. The present invention has been accomplished on the basis of this finding.

Accordingly, the present invention is directed to a process for producing a polyamide, which includes directly melt-polymerizing a diamine component including 70 mol % or more of p-xylylenediamine and a dicarboxylic acid component including 70 mol % or more of a C6 to C18 aliphatic dicarboxylic acid, in the absence of solvent in a batch-type reactor equipped with a stirring blade, the process being characterized by comprising:
(1) reacting the diamine component with the dicarboxylic acid component under a pressure condition of 0.2 to 0.5 MPa (Abs);
(2) maintaining a vapor phase section of a reaction tank of the reactor at 200° C. or higher during reaction;
(3) stirring the contents of the reaction tank, from the start of adding the diamine component until after completion of the addition and before the start of pressure falling, such that the stirring-related Froude number represented by $Fr=(N/60)^2 \times d/g$ (N: stirring rate [rpm], d: diameter of stirring blade [m], and g: gravitational acceleration [m/s$^2$]) is adjusted to 0.0002 to 0.15; and
(4) employing a stirring blade having no structural body in the horizontal direction or having a structural body in the horizontal direction, which body does not come into contact with the interface between the reaction mixture and the vapor phase section during stirring.

Effects of the Invention

According to the present invention, deposition of polymers, a nylon salt, and oligomers in the reaction tank vapor phase section, in a pipe that connects a reaction tank with a partial condenser, and in other members can be suppressed, whereby the frequency of periodically performed washing of the reactor can be reduced, leading to enhanced productivity. In addition, reliable pelletizing operation can be realized, and incorporation of unmelted matter into the product can be reduced, thereby yielding a polyamide of a consistently high quality.

MODES FOR CARRYING OUT THE INVENTION

A characteristic feature of the process of the present invention for producing a polyamide resides in that the process includes directly melt-polymerizing a diamine component including 70 mol % or more of p-xylylenediamine and a dicarboxylic acid component including 70 mol % or more of a C6 to C18 aliphatic dicarboxylic acid in the absence of solvent in a batch-type reactor equipped with a stirring blade, the process being characterized by comprising:
(1) reacting the diamine component with the dicarboxylic acid component under a pressure condition of 0.2 to 0.5 MPa (Abs);
(2) maintaining a vapor phase section of a reaction tank of the reactor at 200° C. or higher during reaction;
(3) stirring the contents of the reaction tank, from the start of adding the diamine component until after completion of the addition and before the start of pressure falling, such that the stirring-related Froude number represented by $Fr=(N/60)^2 \times d/g$ (N: stirring rate [rpm], d: diameter of stirring blade [m], and g: gravitational acceleration [m/s$^2$]) is adjusted to 0.0002 to 0.15; and
(4) employing a stirring blade having no structural body in the horizontal direction or having a structural body in the horizontal direction which body does not come into contact with the interface between the reaction mixture and the vapor phase section during stirring.

(Diamine Component)

The diamine component includes p-xylylenediamine in an amount of 70 mol % or more, preferably 80 mol % or more, more preferably 90 mol % or more (including 100 mol %). When the p-xylylenediamine content satisfies the conditions, the effect of the present invention can be significantly attained.

Examples of the diamine component which may be used in the invention other than p-xylylenediamine include one or more generally known diamines selected from among aliphatic diamines such as trimethylenediamine, tetramethylenediamine, pentamethylenediamine, hexamethylenediamine, 1,7-diaminoheptane, 1,8-diaminooctane, 1,9-diaminononane, 1,10-diaminodecane; aromatic diamines such as p-phenylenediamine, o-phenylenediamine, m-phenylenediamine, and m-xylylenediamine; and alicyclic diamines such as 1,2-bis(aminomethyl)cyclohexane, 1,3-bis(aminomethyl)cyclohexane, and 1,4-bis(aminomethyl)cyclohexane. Of these, the diamine component preferably includes p-xylylenediamine and m-xylylenediamine, from the viewpoints of heat resistance and mechanical properties of polyamide. In this case, the ratio of the amount of m-xylylenediamine to the total amount of p-xylylenediamine and m-xylylenediamine is preferably 30 mol % or less, more preferably 20 mol % or less, still more preferably 10 mol % or less.

(Dicarboxylic Acid Component)

The dicarboxylic acid component used in the invention is a C6 to C18 aliphatic dicarboxylic acid and preferably includes one or more C6 to C18 linear-chain aliphatic dicarboxylic acids in an amount of 70 mol % or more, more preferably 80 mol % or more, still more preferably 90 mol % or more (including 100 mol %). Examples of the C6 to C18 linear-chain aliphatic dicarboxylic acid include α,ω-linear aliphatic dicarboxylic acids such as adipic acid, pimelic acid, suberic acid, azelaic acid, sebacic acid, undecanedioic acid, and dodecanedioic acid. Of these, one or more aliphatic dicarboxylic acids selected from among adipic acid, azelaic acid, sebacic acid, undecanedioic acid, and dodecanedioic acid are preferred. Furthermore, one or more aliphatic dicarboxylic acids selected from among adipic acid, azelaic acid, and sebacic acid are more preferred, with sebacic acid being still more preferred. The aliphatic dicarboxylic acid employed in the present invention has 6 to 18 carbon atoms. From the viewpoint of the balance of water absorbability and heat resistance of polyamide, the aliphatic dicarboxylic acid preferably has 8 to 14 carbon atoms, more preferably 9 to 12 carbon atoms.

Examples of the dicarboxylic acid which may be used in the invention other than the C6 to C18 aliphatic dicarboxylic acid include one or more dicarboxylic acids selected from among C≤5 α,ω-linear aliphatic dicarboxylic acids such as succinic acid and glutaric acid; aromatic dicarboxylic acids such as terephthalic acid, isophthalic acid, 2,6-naphthalenedicarboxylic acid, and 4,4-biphenyldicarboxylic acid; and alicyclic dicarboxylic acids such as 1,4-cyclohexanedicarboxylic acid, 1,3-cyclohexanedicarboxylic acid, decalindicarboxylic acid, and tetralindicarboxylic acid.

No particular limitation is imposed on the polyamide-forming component other than the diamine component and the dicarboxylic acid component, and examples thereof include lactams such as caprolactam, valerolactam, laurolactam, and undecalactam; and aminocarboxylic acids such as 1,1-aminoundecanoic acid and 1,2-aminododecanoic acid.

(Phosphorus Compound)

In the present invention, in order to suppress coloring of the contents during melt-polymerization, a phosphorus compound may be added to the polyamide production system. Examples of the phosphorus compound include phosphoric acid, phosphorous acid, hypophosphorous acid, and a salt or ester thereof. Examples of the phosphate salt include potassium phosphate, sodium phosphate, calcium phosphate, magnesium phosphate, manganese phosphate, nickel phosphate, and cobalt phosphate. Examples of the phosphate ester include methyl phosphate, ethyl phosphate, isopropyl phosphate, butyl phosphate, hexyl phosphate, isodecyl phosphate, decyl phosphate, stearyl phosphate, and phenyl phosphate. Examples of the phosphite salt include potassium phosphite, sodium phosphite, calcium phosphite, magnesium phosphite, manganese phosphite, nickel phosphite, and cobalt phosphite. Examples of the phosphite ester include methyl phosphite, ethyl phosphite, isopropyl phosphite, butyl phosphite, hexyl phosphite, isodecyl phosphite, decyl phosphite, stearyl phosphite, and phenyl phosphite. Examples of the hypophosphite salt include potassium hypophosphite, sodium hypophosphite, calcium hypophosphite, magnesium hypophosphite, manganese hypophosphite, nickel hypophosphite, and cobalt hypophosphite. These phosphorus compounds may be used singly or in combination of two or more species.

In the present invention, no particular limitation is imposed on the method of adding the phosphorus compound. For example, the phosphorus compound may be added to a diamine component or a dicarboxylic acid component serving as a polyamide source, or to the polymerization system.

(Batch-Type Reactor)

The batch-type reactor employed in the present invention has a structure suitable for a pressure-resistant reactor equipped with a stirring unit such as stirring blades. Also, the batch-type reactor of the present invention preferably has a partial condenser that can control the temperature of a heat-conducting surface, in order to suppress vaporization of the diamine component and the dicarboxylic acid component. In addition to the aforementioned stirring unit and the partial condenser, the batch-type reactor of the present invention is preferably equipped with a unit for heating the reaction tank, a thermometer for measuring the temperature of the vapor phase section, a total condenser, a heater for heating the vapor phase section of the reaction tank, a diamine conduit, a nitrogen gas conduit, and other units.

Figure 1:
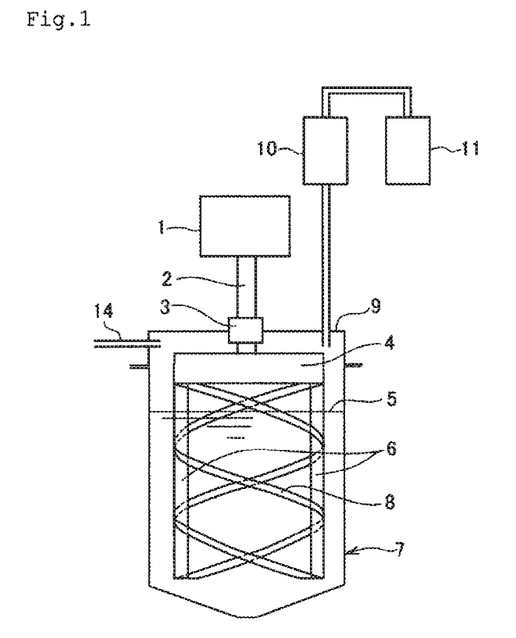
FIG. 1 A sketch of a reactor equipped with spiral helical ribbon blades extending in the vertical direction and employed in Examples and Comparative Examples.
Figure 2:
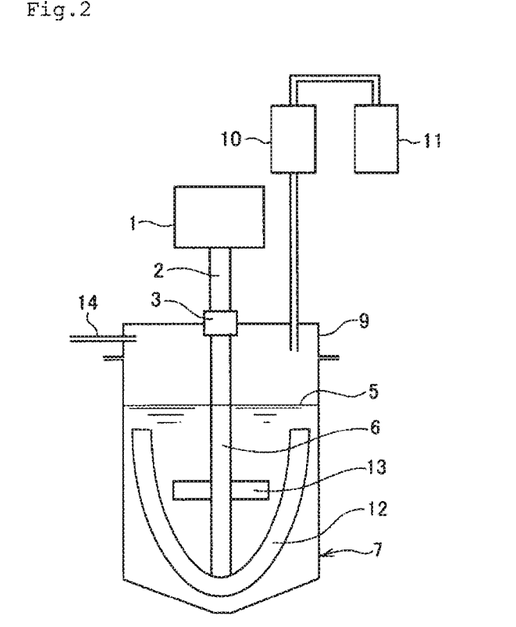
FIG. 2 A sketch of a reactor equipped with stirring blades consisting of an anchor-shape blade and a paddle-shape blade and employed in Examples and Comparative Examples.

FIGS. 1 and 2 schematically show batch-type reactors employed in the Examples of the present invention. The batch-type reactor shown in FIG. 1 includes a reaction tank main body 7, a rotation driving member 1, a rotating shaft 2, a stirring seal part 3, a horizontal cylindrical member 4, a vertical cylindrical member 6, helical ribbon-shape blades 8, a top plate 9, a partial condenser 10, a total condenser 11, and a nitrogen gas conduit 14. The stirring blades included in the batch-type reactor shown in FIG. 1 are helical ribbon-shape blades 8, which are spiral ribbon blades extending in the vertical direction and having no structure in the horizontal direction. The batch-type reactor shown in FIG. 2 includes a reaction tank main body 7, a rotation driving member 1, a rotating shaft 2, a stirring seal part 3, a vertical cylindrical member 6, a top plate 9, an anchor-shape blade 12, a paddle-shape blade 13, a partial condenser 10, a total condenser 11, and a nitrogen gas conduit 14. The stirring blades employed in the batch-type reactor shown in FIG. 2 are the anchor-shape blade 12 and the paddle-shape blade 13. Although the paddle-shape blade 13 is a structural body having a horizontal structure, the structural body does not come into contact with the interface between the reaction mixture and the vapor phase section during stirring.

(Polyamide Production Process)

In a specific mode of the process of the present invention for producing a polyamide, a dicarboxylic acid component and a diamine component are sequentially added to a batch-type reactor, and the two components are allowed to be polymerized.

Specifically, in mixing of the dicarboxylic acid component and the diamine component, the dicarboxylic acid component in the molten state is stirred in the reaction tank, and the diamine component is continuously or intermittently added to the dicarboxylic acid component. During addition, the temperature of the reaction mixture is successively elevated, and the attained temperature is maintained. No particular limitation is imposed on the time over which the diamine component is added. When the addition rate is excessively high, the rate of elevating the temperature of the reaction system may decrease due to poor heating performance. The addition time cannot be unconditionally determined and depends on factors such as the capacity of the reactor and the heating capacity of the heater. However, the reaction time is generally 30 minutes to 5 hours, preferably 30 minutes to 4 hours.

The temperature elevation rate for a reaction mixture of the dicarboxylic acid component and the diamine component depends on factors such as heat of amidation, latent heat of vaporization of condensation water, and amount of supplied heat. Thus, the temperature elevation rate for the diamine component is modified appropriately. The temperature of the reaction mixture at the end of addition of the diamine component is preferably the melting point of the polyamide, at which the reaction mixture is in a molten state, or higher, and lower than (the melting point+35° C.), more preferably lower than (the melting point+15° C.), still more preferably lower than (melting point+5° C.)

In the present invention, the term "melting point" refers to the temperature of the endothermic peak attributed to heat of fusion of crystals of polymer as measured by means of a differential scanning colorimeter (DSC). The melting point of the reaction system may be appropriately checked by means of a DSC or the like.

The condensation water, which is generated with the progress of reaction, is removed to the outside of the reaction system through a partial condenser and a total condenser. Preferably, the diamine component vaporized with condensation water and removed to the outside of the reaction system, the dicarboxylic acid removed through vaporization, and other components are separated from water vapor by means of the partial condenser, and are returned to the reaction tank.

According to the present invention, the pressure at the reaction is adjusted to 0.2 MPa (Abs) or higher, and the temperature of the reaction tank vapor phase section is maintained at high temperature. In the case where the temperature of the reaction tank vapor phase section is maintained at a constant value, when the reaction pressure is elevated, the mole fraction of the diamine component and that of the dicarboxylic acid component in the vapor phase section decrease, whereby vaporization of the diamine component and the dicarboxylic acid component is suppressed. Thus, deposition of a nylon salt or oligomers onto the reaction tank vapor phase section and other members is reduced. The nylon salt and oligomers deposited onto the reaction tank vapor phase section and other members are washed out by a reflux flow of condensation water generated by reaction between the diamine component and the dicarboxylic acid component.

However, in the case of a nylon salt formed from p-xylylenediamine and sebacic acid, which salt has poor water solubility, difficulty is encountered in washing out the nylon salt and oligomer deposits solely by a reflux flow of condensation water. Through maintaining the temperature of the reaction tank vapor phase section at high temperature, the mole fraction of the diamine component in the vapor phase increases. The nylon salt and oligomers, which are not dissolved in water at high temperature, can be dissolved in a reflux liquid containing the diamine component in an amount greater than a specific level. Particularly when the reflux liquid is present in the reaction tank vapor phase section at 200° C. or higher, deposited salt and oligomers are readily dissolved in the reflux liquid. Thus, in the present invention, the internal pressure of the tank during reaction is maintained at 0.2 MPa (Abs) or higher, and the temperature of the reaction tank vapor phase section is maintained at 200° C. or higher.

No particular limitation is imposed on the method of maintaining the temperature of the reaction tank vapor phase section at 200° C. or higher. Examples of the method include attaching a heater to the top plate of the reactor, controlling the reflux rate by controlling the temperature of the partial condenser, and keeping the top plate warm for preventing heat dissipation from the top plate of the reactor.

The method of maintaining the temperature of the reaction tank vapor phase section at 200° C. or higher may be optimized and appropriately selected in consideration of the scale and structure of the reaction tank.

Vaporization of dicarboxylic acid is suppressed after the dicarboxylic acid is fed to the reaction tank, and thereafter, the internal pressure of the reaction tank is elevated to 0.2 MPa (Abs) or higher. However, when the internal pressure of the reaction tank is in excess of 0.5 MPa (Abs), the mole fraction of the diamine component in the vapor phase decreases after the start of dropwise addition of the diamine component. In this case, the effect of dissolving a nylon salt and oligomers in diamine vapor cannot be fully attained. Also, when the temperature of the reaction tank vapor phase section is lower than 200° C., the mole fraction of the diamine component in the vapor phase decreases, and the effect of dissolving a nylon salt and oligomers in diamine vapor cannot be fully attained. From the above viewpoints, in the present invention, the pressure at reaction is 0.2 to 0.5 MPa (Abs), preferably 0.2 to 0.40 MPa (Abs), and the temperature of the reaction tank vapor phase section during reaction is 200° C. or higher, preferably 200 to 300° C., more preferably 200 to 260° C.

In the present invention, the term "the temperature of the reaction tank vapor phase section during reaction" refers to the gas temperature of the reaction tank vapor phase section from the start of reaction between the diamine component and the dicarboxylic acid component to the end of polycondensation.

Scattering of the dicarboxylic acid component or the diamine component into the vapor phase occurs not only in the form of vapor but also in the form of splashing, which is generated through collision of the structural body of a stirring blade with the reaction mixture. Similar to the vapor, the splashes also form a nylon salt and oligomers in the reaction tank vapor phase section. Particularly in the case of a paddle-shape blade or a blade support, having a horizontal structural body at a part of a stirring blade in contact with the surface of the reaction mixture, the stirring blade more frequently comes into contact with the surface of the reaction mixture. As a result, an increased amount of splashes are generated, whereby a nylon salt and oligomers are readily deposited in the reaction tank vapor phase section. Therefore, the present invention preferably employs a stirring blade having no such a structural body in the horizontal direction or having such a structural body in the horizontal direction, which body does not come into contact with the interface between the reaction mixture and the vapor phase section during stirring. In the present invention, one preferred example of the stirring blade is a helical ribbon blade, which is formed of a spiral ribbon blade, having no blade support. A specific example of such a stirring blade which may be employed in the invention is a stirring blade having a shape shown in FIG. 1.

In the present invention, the contents of the reaction tank are stirred from the start of adding the diamine component until after completion of the addition and before the start of pressure falling, such that the stirring-related Froude number defined by formula (1) is adjusted to 0.0002 to 0.15, preferably 0.001 to 0.13, more preferably 0.004 to 0.11, still more preferably 0.01 to 0.100.

$$Fr=(N/60)^2 \times d/g \quad (1).$$

In formula 1, N represents a stirring rate [rpm], d represents a diameter of stirring blade [m], and g represents gravitational acceleration [m/s$^2$]. In the case of helical ribbon blades as shown in FIG. 1, the diameter d of each stirring blade refers to the diameter of a spiral. In the case of stirring blades including an anchor-shape blade and a paddle-shape blade as shown in FIG. 2, the diameter d refers to the width defined as the distance between two edges of the arm of the anchor-shape blade.

Through regulating the stirring-related Froude number to fall within the above ranges, the added diamine component can be rapidly mixed with the reaction mixture, and generation of splashes from the surface of the reaction mixture can be prevented, whereby deposit formation in the reaction tank vapor phase section can be suppressed. The stirring-related Froude number is a ratio of inertial force of stirring to gravitational force. When the inertial force increases; i.e., when the stirring-related Froude number increases excessively, if stirring blades have no structural body in the horizontal direction, splashes are generated through collision of a stirring shaft or blades with the reaction mixture scatter. In such a case, a nylon salt and oligomers are deposited in the reaction tank vapor phase section and in a pipe that connects a reaction tank with a partial condenser.

In the present invention, in order to prevent generation of splashes from the reaction mixture, the aforementioned stirring-related Froude number (Fr) is maintained to fall within the above ranges, from the start of adding the diamine component until after completion of the addition and before the start of pressure falling. Furthermore, the stirring-related Froude number (Fr) may also be maintained to fall within the above ranges, from the start of pressure falling to the start of pressure reduction. Before or after the above-specified periods, the stirring-related Froude number (Fr) may be adjusted to an arbitrary level. However, during pressure falling or pressure reduction, effervescence occurs due to generation of condensation water from the reaction mixture. Thus, stirring is preferably performed so as to prevent a rapid rise in the level of the reaction mixture. As used herein, the term "pressure falling" refers to lowering the internal pressure of the reaction tank to ambient pressure, after reaction of the diamine component with the dicarboxylic acid component at 0.2 to 0.5 MPa (Abs).

In the present invention, since the 70 mol % or more of the diamine is p-xylylenediamine, the melt-polymerization of the diamine component and the dicarboxylic acid component is preferably performed through direct melt-polymerization in which the diamine component is continuously or intermittently added to the molten dicarboxylic acid component in the absence of solvent. This polymerization technique, which requires no time for removing solvent, is preferred. In the case where the dicarboxylic acid component is melted, melting is preferably performed under an inert gas such as nitrogen in order to prevent coloring by oxidation. Melting of the dicarboxylic acid component may be carried out in the reaction tank. Alternatively, the dicarboxylic acid component is melted in a special melting bath, and the melt is fed to the reaction tank. In order to enhance the work efficiency of the reaction tank, the above-mentioned special melting bath is preferably employed.

In the present invention, a polyamide having a mole balance of interest (including diamine component excess, dicarboxylic acid component excess, or equimole) can be produced through appropriately controlling the mole balance of the monomers. One method of controlling the mole balance of monomers includes measuring the entire weight of a molten dicarboxylic acid placed in a melting bath by means of a mass measuring meter, feeding the melt to the reaction tank, and feeding the diamine component to the reaction system while the weight of the diamine reservoir is measured by means of a mass measuring meter. In the present invention, the mass of the diamine component and that of the dicarboxylic acid component are preferably measured by means of a mass measuring meter such as a load cell or a balance.

In the addition of the diamine component to the molten dicarboxylic acid component, the molten dicarboxylic acid is preferably heated to 160° C. or higher, at which amidation substantially proceeds. Also, the reaction temperature is preferably controlled to a level such that formed intermediates; i.e., oligomers and/or low-molecular-weight polyamide, maintain the molten state, to thereby ensure that the entire reaction system has uniform fluidity. In consideration of rate of reaction and decomposition temperature of the formed amide, the reaction temperature in the synthesis of polyamide is generally 150 to 350° C., preferably 180 to 320, more preferably 200 to 320° C., still more preferably 270 to 320° C. The term "the reaction temperature in the synthesis of polyamide" refers to the liquid temperature of the reaction mixture yielded through addition of the diamine component to the dicarboxylic acid component.

After completion of adding the diamine component, the internal pressure of the reaction tank is lowered to ambient pressure, and preferably lowered to a reduced pressure, more preferably to 80 kPa or less. Through lowering the internal pressure of the reaction tank to 80 kPa or less, water vapor present in the vapor phase section can be removed to the outside of the reaction system, whereby the polymerization degree of the product can be further enhanced on the basis of the equilibrium of amidation. The pressure falling rate, which depends on the scale and internal pressure of the reaction tank, is preferably 0.002 to 0.02 MPa/minute.

In the present invention, after completion of the addition of the diamine component and before the start of pressure falling, the contents of the reaction tank are preferably maintained at the pressure employed at the completion of addition of the diamine component for 5 minutes to 3 hours, more preferably 10 minutes to 1 hour. Through maintaining the contents at the pressure employed at the completion of addition of the diamine component for the above-specified period, the mole balance of the monomers can be correctly reproduced to the produced polyamide.

After pressure falling, the produced polyamide is discharged from the reaction tank generally through pressuring the reaction tank. In the present invention, the start of pressuring the reaction tank is defined as termination of polycondensation. In the pressurization, an inert gas such as nitrogen is preferably used. According to the present invention, only small amounts of a nylon salt and oligomers are deposited in the reaction tank after discharge of the produced polyamide, thereby enabling subsequent batch reaction. Thus, the present invention enables continuous batch-manner production of polyamide.

EXAMPLES

The present invention will next be described in detail by way of Examples and Comparative Examples, which should not be construed as limiting the invention thereto.

After completion of synthesis of polyamide, deposition of a nylon salt formed from a diamine and a dicarboxylic acid, oligomers, or polymers in the reaction tank vapor phase section (including a pipe to a partial condenser, when the reactor was equipped with the partial condenser) was observed, and the deposition state was assessed by the following ratings.

(Assessment Ratings)

No deposit: the case where the solid matter deposited on a surface of the vapor phase section of the reactor (including a pipe to a partial condenser, when the reactor was equipped with the partial condenser) had a mean thickness less than 0.5 mm, and no solid matter having a thickness of 3 mm or more was deposited in the vapor phase section or a structural body present in the vapor phase section.

Deposits: the case where the solid matter deposited on a surface of the vapor phase section of the reactor (including a pipe to a partial condenser, when the reactor was equipped with the partial condenser) had a mean thickness 0.5 mm or more, or solid matter having a thickness of 3 mm or more was deposited in the vapor phase section or a structural body present in the vapor phase section, even though the deposition occurred locally.

Example 1

A polyamide was synthesized by means of a 6-L stainless steel batch-type reactor fully covered by a mantle heater. The reactor was equipped with helical ribbon blades 8, having spiral ribbon blades extending in the vertical direction as shown in FIG. 1, and a partial condenser in which a temperature-controlled oil can circulate, a total condenser, and a nitrogen gas conduit.

The specific synthesis procedure is as follows. In a reaction tank, 1,810 g of sebacic acid (purity: 99.70 wt. %) was placed, and the internal atmosphere of the reaction tank was thoroughly replaced with nitrogen. The internal pressure of the tank was elevated to 0.4 MPa (Abs), and the sebacic acid was heated to 190° C. under stirring. When the temperature had reached 190° C., 1,215 g of p-xylylenediamine (purity: 99.85 wt. %) was added dropwise thereto over 110 minutes. Heating was controlled such that the temperature of the reaction mixture after completion of dropwise addition of the diamine was adjusted to 300° C., and the pressure at reaction was maintained at 0.4 MPa (Abs). The outlet vapor temperature of the partial condenser was regulated at 144 to 147° C., and the vapor generated from the reaction was condensed by passage through the total condenser and discharged from the reaction system. After completion of dropwise addition of the diamine, the reaction was maintained at the above temperature and at 0.4 MPa (Abs) for 15 minutes under stirring. The pressure of the reaction tank was lowered to ambient pressure at a lowering rate of 0.01 MPa/minute over 30 minutes, and further lowered to 80 kPa (Abs). The reaction was maintained at 80 kPa (Abs) for 10 minutes under stirring. The stirring blades were rotated in such a direction that the blades pressed down the reaction mixture; i.e., that the blades generated a downstream flow. From the start of dropwise addition of the diamine until the pressure was maintained at 0.4 MPa (Abs) after termination of the addition, the reaction was stirred at a stirring-related Froude number Fr of 0.045 (100 rpm). Thereafter, stirring was performed such that a horizontal cylindrical member 4, serving as a member connecting the blades and the rotating shaft, was always located above the liquid surface. The gas in the reaction tank vapor phase section was maintained at 200° C. or higher by means of a heater disposed outside the top plate of the reaction tank from the start of dropwise addition of the diamine to termination of polycondensation reaction. The reaction was continuously stirred at 80 kPa (Abs) for 10 minutes, and stirring was stopped, while pressurizing the inside of the reactor with nitrogen, whereby polycondensation reaction was terminated. The produced polymer was removed from the bottom of the reactor. This synthesis procedure was repeatedly performed five times in total. When the inside of the reaction tank and that of the pipe connecting the reaction tank and the partial condenser were observed, no deposit was observed. Table 1 shows the results.

Example 2

A polyamide was synthesized by means of a 50-L stainless steel batch-type reactor whose reaction tank was fully covered by an oil-circulating jacket. The reactor was equipped with helical ribbon blades 8, having spiral ribbon blades extending in the vertical direction as shown in FIG. 1, and a partial condenser in which a temperature-controlled oil can circulate, a total condenser, and a nitrogen gas conduit.

The specific synthesis procedure is as follows. In a reaction tank, 15.133 kg of sebacic acid (purity: 99.70 wt. %) was placed, and the internal atmosphere of the reaction tank was thoroughly replaced with nitrogen. The internal pressure of the tank was elevated to 0.4 MPa (Abs), and the sebacic acid was heated to 190° C. under stirring. When the temperature had reached 190° C., 10.125 kg of p-xylylenediamine (purity: 99.85 wt. %) was added dropwise thereto over 110 minutes. Heating was controlled such that the temperature of the reaction mixture after completion of dropwise addition of the diamine was adjusted to 300° C., and the pressure at reaction was maintained at 0.4 MPa (Abs). The outlet vapor temperature of the partial condenser was regulated at 144 to 147° C., and the vapor generated from the reaction was condensed by passage through the total condenser and discharged from the reaction system. After completion of dropwise addition of the diamine, the reaction was maintained at the above temperature and at 0.4 MPa (Abs) for 15 minutes under stirring. The pressure of the reaction tank was lowered to ambient pressure at a lowering rate of 0.01 MPa/minute over 30 minutes, and further lowered to 80 kPa (Abs). The reaction was maintained at 80 kPa (Abs) for 10 minutes under stirring. From the start of dropwise addition of the diamine until the pressure was maintained at 0.4 MPa (Abs) after termination of the addition, the reaction was stirred at a stirring-related Froude number Fr of 0.094 (100 rpm). Thereafter, stirring was performed such that a horizontal cylindrical member, serving as a member connecting the blades and the rotating shaft, was always located above the liquid surface. The stirring blades were rotated in such a direction that the blades pressed down the reaction mixture; i.e., that the blades generated a downstream flow. The gas in the reaction tank vapor phase section was maintained at 200° C. or higher by means of a heater disposed outside the top plate of the reaction tank from the start of dropwise addition of the diamine to termination of polycondensation reaction. The reaction was continuously stirred at 80 kPa (Abs) for 10 minutes, and stirring was stopped, while pressurizing the inside of the reactor with nitrogen, whereby polycondensation reaction was terminated. The produced polymer was removed from the bottom of the reactor. This synthesis procedure was repeatedly performed thrice. When the inside of the reaction tank and that of the pipe connecting the reaction tank and the partial condenser were observed, no deposit was observed. Table 1 shows the results.

Example 3

A polyamide was synthesized by means of a 500-L stainless steel batch-type reactor whose reaction tank was fully covered by an oil-circulating jacket. The reactor was equipped with helical ribbon blades 8, having spiral ribbon blades extending in the vertical direction as shown in FIG. 1, and a partial condenser in which a temperature-controlled oil can circulate, a total condenser, and a nitrogen gas conduit.

The specific synthesis procedure is as follows. In a reaction tank, 90.00 kg of sebacic acid (purity: 99.85 wt. %) was placed, and the internal atmosphere of the reaction tank was thoroughly replaced with nitrogen. The internal pressure of the tank was elevated to 0.4 MPa (Abs), and the sebacic acid was heated to 190° C. under stirring. When the temperature had reached 190° C., 134.65 kg of p-xylylenediamine (purity: 99.8 wt. %) was added dropwise thereto over 110 minutes. Heating was controlled such that the temperature of the reaction mixture after completion of dropwise addition of the diamine was adjusted to 300° C., and the pressure at reaction was maintained at 0.4 MPa (Abs). The outlet vapor temperature of the partial condenser was regulated at 144 to 147° C., and the vapor generated from the reaction was condensed by passage through the total condenser and discharged from the reaction system. After completion of dropwise addition of the diamine, the reaction was maintained at the above temperature and at 0.4 MPa (Abs) for 15 minutes under stirring. The pressure of the reaction tank was lowered to ambient pressure at a lowering rate of 0.01 MPa/minute over 30 minutes, and further lowered to 80 kPa (Abs). The reaction was maintained at 80 kPa (Abs) for 10 minutes under stirring. From the start of dropwise addition of the diamine until the pressure was maintained at 0.4 MPa (Abs) after termination of the addition, the reaction was stirred at a stirring-related Froude number Fr of 0.033 (41 rpm). Thereafter, stirring was performed such that a horizontal cylindrical member, serving as a member connecting the blades and the rotating shaft, was always located above the liquid surface. The stirring blades were rotated in such a direction that the blades pressed down the reaction mixture; i.e., that the blades generated a downstream flow.

The gas in the reaction tank vapor phase section was maintained at 200° C. or higher by keeping the top plate on a top of the reaction tank with a lag from the start of dropwise addition of the diamine to termination of polycondensation reaction. The reaction was continuously stirred at 80 kPa (Abs) for 10 minutes, and stirring was stopped, while pressurizing the inside of the reactor with nitrogen, whereby polycondensation reaction was terminated. The produced polymer was removed from the bottom of the reactor. This synthesis procedure was repeatedly performed five times. When the inside of the reaction tank and that of the pipe connecting the reaction tank and the partial condenser were observed, no deposit was observed. Table 1 shows the results.

Example 4

A polyamide was synthesized by means of a 50-L stainless steel batch-type reactor whose reaction tank was fully covered by an oil-circulating jacket. The reactor was equipped with stirring blades including an anchor-shape blade 12 and a paddle-shape blade 13 as shown in FIG. 2, and a partial condenser in which a temperature-controlled oil can circulate, a total condenser, and a nitrogen gas conduit.

The specific synthesis procedure is as follows. In a reaction tank, 9.400 kg of sebacic acid (purity: 99.70 wt. %) was placed, and the internal atmosphere of the reaction tank was thoroughly replaced with nitrogen. The internal pressure of the tank was elevated to 0.4 MPa (Abs), and the sebacic acid was heated to 190° C. under stirring. When the temperature had reached 190° C., 6.290 kg of p-xylylenediamine (purity: 99.85 wt. %) was added dropwise thereto over 110 minutes. Heating was controlled such that the temperature of the reaction mixture after completion of dropwise addition of the diamine was adjusted to 300° C., and the pressure at reaction was maintained at 0.4 MPa (Abs). The outlet vapor temperature of the partial condenser was regulated at 144 to 147° C., and the vapor generated from the reaction was condensed by passage through the total condenser and discharged from the reaction system. After completion of dropwise addition of the diamine, the reaction was maintained at the above temperature and at 0.4 MPa (Abs) for 15 minutes under stirring. The pressure of the reaction tank was lowered to ambient pressure at a lowering rate of 0.01 MPa/minute over 30 minutes, and further lowered to 80 kPa (Abs). The reaction was maintained at 80 kPa (Abs) for 10 minutes under stirring. From the start of dropwise addition of the diamine until the pressure was maintained at 0.4 MPa (Abs) after termination of the addition, the reaction was stirred at a stirring-related Froude number Fr of 0.019 (45 rpm). From the start of dropwise addition of the diamine to pressure falling and pressure reduction and thereafter, stirring was performed such that the horizontal paddle-shape blade of the stirring blades was always maintained so as not to be in contact with the liquid surface. The stirring blades were rotated in such a direction that the blades pressed down the reaction mixture; i.e., that the blades generated a downstream flow. The gas in the reaction tank vapor phase section was maintained at 200° C. or higher by means of a heater disposed outside the top plate of the reaction tank from the start of dropwise addition of the diamine to termination of polycondensation reaction. The reaction was continuously stirred at 80 kPa (Abs) for 10 minutes, and stirring was stopped, while pressurizing the inside of the reactor with nitrogen, whereby polycondensation reaction was terminated. The produced polymer was removed from the bottom of the reactor. This synthesis procedure was repeatedly performed thrice. When the inside of the reaction tank and that of the pipe connecting the reaction tank and the partial condenser were observed, no deposit was observed. Table 1 shows the results.

Example 5

The reaction of Example 1 was repeated under the same conditions, except that 1,214 g of a diamine mixture of 90 mol % of p-xylylenediamine (purity: 99.85 wt. %) and 10 mol % of m-xylylenediamine (purity: 99.95 wt. %) was used as the diamine component instead of p-xylylenediamine. This synthesis procedure was repeatedly performed five times. When the inside of the reaction tank and that of the pipe connecting the reaction tank and the partial condenser were observed, no deposit was observed. Table 1 shows the results.

Comparative Example 1

A polyamide was synthesized by use of the same 6-L stainless steel batch-type reactor as employed in Example 1.

The specific synthesis procedure is as follows. In a reaction tank, 1,810 g of sebacic acid (purity: 99.70 wt. %) was placed, and the internal atmosphere of the reaction tank was thoroughly replaced with nitrogen. The internal pressure of the tank was elevated to 0.4 MPa (Abs), and the sebacic acid was heated to 190° C. under stirring. When the temperature had reached 190° C., 1,215 g of p-xylylenediamine (purity: 99.85 wt. %) was added dropwise thereto over 110 minutes. Heating was controlled such that the temperature of the reaction mixture after completion of dropwise addition of the diamine was adjusted to 300° C., and the pressure at reaction was maintained at 0.4 MPa (Abs). The outlet vapor temperature of the partial condenser was regulated at 144 to 147° C., and the vapor generated from the reaction was condensed by passage through the total condenser and discharged from the reaction system. After completion of dropwise addition of the diamine, the reaction was maintained at the above temperature and at 0.4 MPa (Abs) for 15 minutes under stirring. The pressure of the reaction tank was lowered to ambient pressure at a lowering rate of 0.01 MPa/minute over 30 minutes, and further lowered to 80 kPa (Abs). The reaction was maintained at 80 kPa (Abs) for 10 minutes under stirring. The stirring blades were rotated in such a direction that the blades pressed down the reaction mixture; i.e., that the blades generated a downstream flow. From the start of dropwise addition of the diamine until the pressure was maintained at 0.4 MPa (Abs) after termination of the addition, the reaction was stirred at a stirring-related Froude number Fr of 0.181 (200 rpm). Thereafter, stirring was performed such that a horizontal cylindrical member, serving as a member connecting the blades and the rotating shaft, was always located above the liquid surface. The gas in the reaction tank vapor phase section was maintained at 200° C. or higher by means of a heater disposed outside the top plate of the reaction tank from the start of dropwise addition of the diamine to termination of polycondensation reaction. The reaction was continuously stirred at 80 kPa (Abs) for 10 minutes, and stirring was stopped, while pressurizing the inside of the reactor with nitrogen, whereby polycondensation reaction was terminated. The produced polymer was removed from the bottom of the reactor. After completion of the synthesis, the inside of the reaction tank and that of the pipe connecting the reaction tank and the partial condenser were observed. As a result, deposits of a diamine-dicarboxylic acid nylon salt and oligomers were observed. Table 1 shows the results.

Comparative Example 2

A polyamide was synthesized by use of the same 6-L stainless steel batch-type reactor as employed in Example 1.

The specific synthesis procedure is as follows. In a reaction tank, 1,810 g of sebacic acid (purity: 99.70 wt. %) was placed, and the internal atmosphere of the reaction tank was thoroughly replaced with nitrogen. While the internal pressure of the tank was maintained at 0.1 MPa (Abs), the sebacic acid was heated to 190° C. under stirring. When the temperature had reached 190° C., 1,215 g of p-xylylenediamine (purity: 99.85 wt. %) was added dropwise thereto over 110 minutes. Heating was controlled such that the temperature of the reaction mixture after completion of dropwise addition of the diamine was adjusted to 300° C., and the pressure at reaction was maintained at 0.1 MPa (Abs). The outlet vapor temperature of the partial condenser was regulated at 101 to 105° C., and the vapor generated from the reaction was condensed by passage through the total condenser and discharged from the reaction system. After completion of dropwise addition of the diamine, the reaction was maintained at the above temperature and at 0.1 MPa (Abs) for 15 minutes under stirring. Then, the pressure of the reaction tank was lowered to 80 kPa (Abs) and the reaction was maintained at 80 kPa (Abs) for 10 minutes under stirring. The stirring blades were rotated in such a direction that the blades pressed down the reaction mixture; i.e., that the blades generated a downstream flow. From the start of dropwise addition of the diamine to the start of pressure reduction, the reaction was stirred at a stirring-related Froude number Fr of 0.045 (100 rpm). Thereafter, stirring was performed such that a horizontal cylindrical member, serving as a member connecting the blades and the rotating shaft, was always located above the liquid surface. The gas in the reaction tank vapor phase section was maintained at 200° C. or higher by means of a heater disposed outside the top plate of the reaction tank from the start of dropwise addition of the diamine to termination of polycondensation reaction. The reaction was continuously stirred at 80 kPa (Abs) for 10 minutes, and stirring was stopped, while pressurizing the inside of the reactor with nitrogen, whereby polycondensation reaction was terminated. The produced polymer was removed from the bottom of the reactor. After completion of the synthesis, the inside of the reaction tank and that of the pipe connecting the reaction tank and the partial condenser were observed. As a result, deposits of a diamine-dicarboxylic acid nylon salt and oligomers were observed. Table 1 shows the results.

Comparative Example 3

A polyamide was synthesized by use of the same 6-L stainless steel batch-type reactor as employed in Example 1.

The specific synthesis procedure is as follows. In a reaction tank, 1,810 g of sebacic acid (purity: 99.70 wt. %) was placed, and the internal atmosphere of the reaction tank was thoroughly replaced with nitrogen. While the internal pressure of the tank was maintained at 1.1 MPa (Abs), the sebacic acid was heated to 190° C. under stirring. When the temperature had reached 190° C., 1,215 g of p-xylylenediamine (purity: 99.85 wt. %) was added dropwise thereto over 110 minutes. Heating was controlled such that the temperature of the reaction mixture after completion of dropwise addition of the diamine was adjusted to 300° C., and the pressure at reaction was maintained at 1.1 MPa (Abs). The outlet vapor temperature of the partial condenser was regulated at 179 to 182° C., and the vapor generated from the reaction was condensed by passage through the total condenser and discharged from the reaction system. After completion of dropwise addition of the diamine, the reaction was maintained at the above temperature and at 1.1 MPa (Abs) for 15 minutes under stirring. The pressure of the reaction tank was lowered to ambient pressure at a lowering rate of 0.02 MPa/minute over 50 minutes, and further lowered to 80 kPa (Abs). The reaction was maintained at 80 kPa (Abs) for 10 minutes under stirring. The stirring blades were rotated in such a direction that the blades pressed down the reaction mixture; i.e., that the blades generated a downstream flow. From the start of dropwise addition of the diamine until the pressure was maintained at 0.4 MPa (Abs) after termination of the addition, the reaction was stirred at a stirring-related Froude number Fr of 0.045 (100 rpm). Thereafter, stirring was performed such that a horizontal cylindrical member, serving as a member connecting the blades and the rotating shaft, was always located above the liquid surface. The gas in the reaction tank vapor phase section was maintained at 200° C. or higher by means of a heater disposed outside the top plate of the reaction tank from the start of dropwise addition of the diamine to termination of polycondensation reaction. The reaction was continuously stirred at 80 kPa (Abs) for 10 minutes, and stirring was stopped, while pressurizing the inside of the reactor with nitrogen, whereby polycondensation reaction was terminated. The produced polymer was removed from the bottom of the reactor. After completion of the synthesis, the inside of the reaction tank and that of the pipe connecting the reaction tank and the partial condenser were observed. As a result, deposits of a diamine-dicarboxylic acid salt and oligomers were observed. Table 1 shows the results.

Comparative Example 4

A polyamide was synthesized by use of the same 50-L stainless steel batch-type reactor as employed in Example 2.

The specific synthesis procedure is as follows. In a reaction tank, 15.133 kg of sebacic acid (purity: 99.70 wt. %) was placed, and the internal atmosphere of the reaction tank was thoroughly replaced with nitrogen. The internal pressure of the tank was elevated to 0.4 MPa (Abs), the sebacic acid was heated to 190° C. under stirring. When the temperature had reached 190° C., 10.125 kg of p-xylylenediamine (purity: 99.85 wt. %) was added dropwise thereto over 110 minutes. Heating was controlled such that the temperature of the reaction mixture after completion of dropwise addition of the diamine was adjusted to 300° C., and the pressure at reaction was maintained at 0.4 MPa (Abs). The outlet vapor temperature of the partial condenser was regulated at 144 to 147° C., and the vapor generated from the reaction was condensed by passage through the total condenser and discharged from the reaction system. After completion of dropwise addition of the diamine, the reaction was maintained at the above temperature and at 0.4 MPa (Abs) for 15 minutes under stirring. The pressure of the reaction tank was lowered to ambient pressure at a lowering rate of 0.01 MPa/minute over 30 minutes, and further lowered to 80 kPa (Abs). The reaction was maintained at 80 kPa (Abs) for 10 minutes under stirring. From the start of dropwise addition of the diamine until the pressure was maintained at 0.4 MPa (Abs) after termination of the addition, the reaction was stirred at a stirring-related Froude number Fr of 0.094 (100 rpm). Thereafter, stirring was performed such that a horizontal cylindrical member, serving as a member connecting the blades and the rotating shaft, was always located above the liquid surface. The stirring blades were rotated in such a direction that the blades pressed down the reaction mixture; i.e., that the blades generated a downstream flow. The gas in the reaction tank vapor phase section was maintained at 150° C. or higher and lower than 200° C. from the start of dropwise addition of the diamine to termination of polycondensation reaction. The reaction was continuously stirred at 80 kPa (Abs) for 10 minutes, and stirring was stopped, while pressurizing the inside of the reactor with nitrogen, whereby polycondensation reaction was terminated. The produced polymer was removed from the bottom of the reactor. This synthesis procedure was repeatedly performed thrice. When the inside of the reaction tank and that of the pipe connecting the reaction tank and the partial condenser were observed, deposits of a diamine-dicarboxylic acid nylon salt and oligomers were observed. Table 1 shows the results.

Comparative Example 5

A polyamide was synthesized by use of the same 50-L stainless steel batch-type reactor as employed in Example 4.

The specific synthesis procedure is as follows. In a reaction tank, 15.133 kg of sebacic acid (purity: 99.70 wt. %) was placed, and the internal atmosphere of the reaction tank was thoroughly replaced with nitrogen. The internal pressure of the tank was elevated to 0.4 MPa (Abs), the sebacic acid was heated to 190° C. under stirring. When the temperature had reached 190° C., 10.125 kg of p-xylylenediamine (purity: 99.85 wt. %) was added dropwise thereto over 110 minutes. Heating was controlled such that the temperature of the reaction mixture after completion of dropwise addition of the diamine was adjusted to 300° C., and the pressure at reaction was maintained at 0.4 MPa (Abs). The outlet vapor temperature of the partial condenser was regulated at 144 to 147° C., and the vapor generated from the reaction was condensed by passage through the total condenser and discharged from the reaction system. After completion of dropwise addition of the diamine, the reaction was maintained at the above temperature and at 0.4 MPa (Abs) for 15 minutes under stirring. The pressure of the reaction tank was lowered to ambient pressure at a lowering rate of 0.01 MPa/minute over 30 minutes, and further lowered to 80 kPa (Abs). The reaction was maintained at 80 kPa (Abs) for 10 minutes under stirring. From the start of dropwise addition of the diamine until the pressure was maintained at 0.4 MPa (Abs) after termination of the addition, the reaction was stirred at a stirring-related Froude number Fr of 0.088 (100 rpm). From the start of dropwise addition of the diamine until the pressure was maintained at 80 kPa (Abs) after the start of pressure reduction, the horizontal paddle-shape blade of the stirring blades was always in contact with the liquid surface and a portion near the surface. The stirring blades were rotated in such a direction that the blades pressed down the reaction mixture; i.e., that the blades generated a downstream flow. The gas in the reaction tank vapor phase section was maintained at 200° C. or higher by means of a heater disposed outside the top plate of the reaction tank. The deposition state of a nylon salt and oligomers inside the reaction tank and the pipe connecting the reaction tank and the partial condenser was visually observed. As a result, deposits increased after repeated synthesis operations. After three continuous synthesis operations, the reaction tank vapor phase section was covered with blocks of the deposits, and a large amount of deposits were observed in the pipe connecting the reaction tank and the partial condenser. Table 1 shows the results.

From the resins produced in Example 3 and Comparative Example 5, test pieces (with notch) in accordance with JIS K7111 were prepared, and a Charpy impact test was carried out by use of the test pieces. The test pieces made of the resin produced in Example 3 exhibited a ratio (intralot measurement standard deviation/intralot measurement average×100) of 10%, whereas the test pieces made of the resin produced in Comparative Example 5 exhibited a ratio (intralot measurement standard deviation/intralot measurement average×100) of 32%, indicating a large deviation in a single lot. Such a large deviation in a single lot is attributed to incorporation of deposits formed in the tank into the reaction mixture and subsequent dispersion of the deposits to thereby provide structural defects.

TABLE 1

| | Examples | | | | | Comparative Examples | | | | |
|---|---|---|---|---|---|---|---|---|---|---|
| | 1 | 2 | 3 | 4 | 5*2 | 1 | 2 | 3 | 4 | 5 |
| Scale of reactor [L] | 6 | 50 | 500 | 50 | 6 | 6 | 6 | 6 | 50 | 50 |
| Reaction pressure [MPa (Abs)] | 0.4 | 0.4 | 0.4 | 0.4 | 0.4 | 0.4 | 0.1 | 1.1 | 0.4 | 0.4 |
| Vapor phase temp. (min/max)*1 | 208/263 | 206/240 | 205/238 | 210/260 | 204/262 | 206/261 | 204/263 | 224/264 | 150/197 | 219/252 |
| Stirring Froude No. (Fr) | 0.045 | 0.094 | 0.033 | 0.019 | 0.045 | 0.181 | 0.045 | 0.045 | 0.094 | 0.088 |

TABLE 1-continued

|  | Examples | | | | | Comparative Examples | | | | |
| --- | --- | --- | --- | --- | --- | --- | --- | --- | --- | --- |
|  | 1 | 2 | 3 | 4 | 5*2 | 1 | 2 | 3 | 4 | 5 |
| Shape of stirring blade | FIG. 1 | FIG. 1 | FIG. 1 | FIG. 2 | FIG. 1 | FIG. 1 | FIG. 1 | FIG. 1 | FIG. 1 | FIG. 2 |
| Liq. contact of horizontal structure of blade | no | no | no | no | no | no | no | no | no | yes |
| Presence of deposits | no | no | no | no | no | yes | yes | yes | yes | yes |

*1: Highest temp. (° C.) and lowest temp. (° C.) of the vapor phase section from the start of dropwise addition of diamine to the end of polycondensation
*2Diamine component: diamine mixture of 90 mol % of p-xylylenediamine and 10 mol % of m-xylylenediamine

INDUSTRIAL APPLICABILITY

According to the present invention, deposition of polymers, a nylon salt, and oligomers in the reaction tank vapor phase section, in a pipe that connects a reaction tank with a partial condenser, and in other members can be suppressed, whereby the frequency of periodically performed washing of the reactor can be reduced, leading to enhanced productivity. In addition, reliable pelletizing can be realized, and incorporation of unmelted matter into the product can be reduced, thereby yielding a polyamide of a consistently high quality. Thus, the process of the invention can be effectively applied to the batch-manner process for producing a polyamide including directly melt-polymerizing a diamine component including 70 mol % or more of p-xylylenediamine and a dicarboxylic acid component including 70 mol % or more of a C6 to C18 aliphatic dicarboxylic acid in the absence of solvent.

DESCRIPTION OF REFERENCE NUMERALS

1: Rotation driving member
2: Rotating shaft
3: Stirring seal part
4: Horizontal cylindrical member
5: Liquid surface
6: vertical cylindrical member
7: Reaction tank main body
8: Helical ribbon-shape blade
9: Top plate
10: Partial condenser
11: Total condenser
12: Anchor-shape blade
13: Paddle-shape blade
14: Nitrogen gas conduit

The invention claimed is:

1. A process for producing a polyamide, which process includes directly melt-polymerizing a diamine component including 70 mol % or more of p-xylylenediamine and a dicarboxylic acid component including 70 mol % or more of a C6 to C18 aliphatic dicarboxylic acid, in the absence of solvent in a batch-type reactor equipped with a stirring blade, the process being characterized by comprising:

(1) reacting the diamine component with the dicarboxylic acid component under a pressure condition of 0.2 to 0.5 MPa (Abs);

(2) maintaining a vapor phase section of a reaction tank of the reactor at 200° C. or higher during reaction by one or more steps selected from the group consisting of attaching a heater to a top plate of the reactor, controlling a reflux rate by controlling a temperature of a partial condenser on the reactor, and preventing heat dissipation at the top plate of the reactor;

(3) stirring the contents of the reaction tank, from the start of adding the diamine component until after completion of the addition and before the start of pressure falling, such that the stirring-related Froude number represented by $Fr=(N/60)^2 \times d/g$ (N: stirring rate [rpm], d: diameter of stirring blade [m], and g: gravitational acceleration [m/s$^2$]) is adjusted to 0.0002 to 0.15; and (4) employing a stirring blade having no structural body in the horizontal direction or having a structural body in the horizontal direction, which body does not come into contact with the interface between the reaction mixture and the vapor phase section during stirring.

2. A polyamide production process according to claim 1, wherein the diamine component includes p-xylylenediamine and m-xylylenediamine.

3. A polyamide production process according to claim 1, wherein the C6 to C18 aliphatic dicarboxylic acid is sebacic acid.

4. A polyamide production process according to claim 1, wherein the stirring blade is a helical ribbon blade having a spiral ribbon blade.

5. A polyamide production process according to claim 1, wherein the vapor phase section of the tank is maintained at 200° C. or higher during reaction by attaching a heater to a top plate of the reactor.

6. A polyamide production process according to claim 1, wherein the vapor phase section of the tank is maintained at 200° C. or higher during reaction by controlling a reflux rate by controlling a temperature of the partial condenser on the reactor.

7. A polyamide production process according to claim 1, wherein the vapor phase section of the tank is maintained at 200° C. or higher during reaction by preventing heat dissipation at the top plate of the reactor.

8. A polyamide production process according to claim 1, wherein the diamine component includes 80 mol % or more of p-xylylenediamine.

9. A polyamide production process according to claim 1, wherein the diamine component includes 90 mol % or more of p-xylylenediamine.

10. A polyamide production process according to claim 1, further comprising discharging the produced polyamide from the reaction tank and performing steps (1) through (4) in a subsequent batch reaction to produce additional polyamide.

11. A polyamide production process according to claim 10, wherein after the subsequent batch reaction, any solid matter deposited in the vapor phase section of the reaction tank has a mean thickness of less than 0.5 mm and no solid matter has been deposited having a thickness of greater than 3 mm.

12. A polyamide production process according to claim 4, wherein the stirring blade rotates to create a downward flow on the contents of the reaction tank.

* * * * *